United States Patent [19]
Booth et al.

[11] 3,772,916
[45] Nov. 20, 1973

[54] VARIABLE INCREMENT TRANSDUCER FOR FLUID FLOW METERING SYSTEMS

[75] Inventors: William M. Booth, Grand Haven; Robert C. Thompson, Muskegon, both of Mich.

[73] Assignee: Bennett Pump Incorporated, Muskegon, Mich.

[22] Filed: Dec. 8, 1971

[21] Appl. No.: 205,800

[52] U.S. Cl............. 73/194 E, 73/198, 235/92 FL, 324/175
[51] Int. Cl........................ G01f 15/06, B67d 5/22
[58] Field of Search................. 235/94 A, 92 FL, 235/151.34; 73/194 R, 194 E, 198, 229, 231 R; 324/175

[56] References Cited
UNITED STATES PATENTS

| | | | |
|---|---|---|---|
| 3,666,928 | 5/1972 | Burke et al. .................. | 235/94 A X |
| 3,156,115 | 11/1964 | Adelmann...................... | 73/198 |
| 3,175,152 | 3/1965 | Shafer.......................... | 307/311 X |
| 3,304,429 | 2/1967 | Bonin et al. .................. | 307/311 X |
| 3,384,837 | 5/1968 | Toussaint et al.............. | 307/311 X |
| 3,663,838 | 5/1972 | Reimers......................... | 307/311 |
| 3,043,508 | 7/1962 | Wright............................ | 235/92 FL |
| 3,543,008 | 11/1970 | Kes et al. ....................... | 235/92 FL |
| 3,580,421 | 5/1971 | Bickford ......................... | 235/92 FL |

*Primary Examiner*—Charles A. Ruehl
*Attorney*—Thomas M. Marshall

[57] ABSTRACT

A solid state device for generating signals in response to a flow metering device is composed of a fixed frequency signal generator periodically blocked for more then one of its oscillation periods by the output of a second signal generator composed of a light emitting diode, a phototransistor, an interposed perforated shutter disc driven by the flow metering device and suitable amplifier, in particular a Schmitt trigger circuit. This combination forms a variable increment transducer suitable for location near equipment for dispensing flammable fuilds. The output of the transducer, consisting of successive pulse trains of fixed frequency but variable length, is supplied to equipment which (a) counts the number of pulse trains to register total volume (b) limits the number of pulses in each train to a price related number and (c) counts the pulses so limited to register total price.

11 Claims, 7 Drawing Figures

PATENTED NOV 20 1973
SHEET 1 OF 2
3,772,916
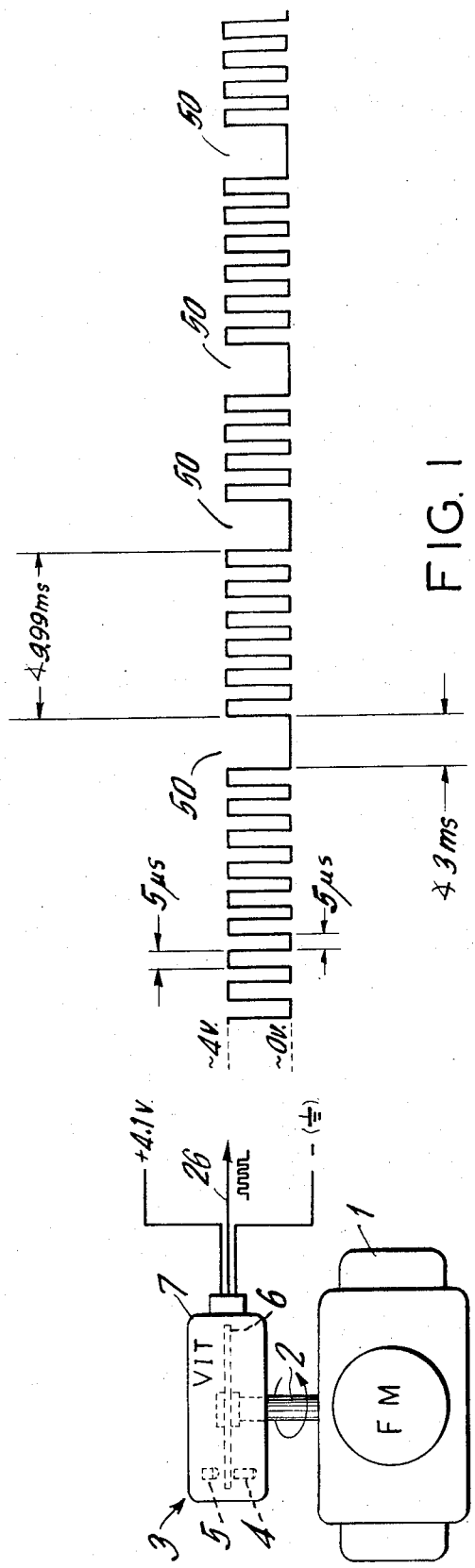
FIG. 1
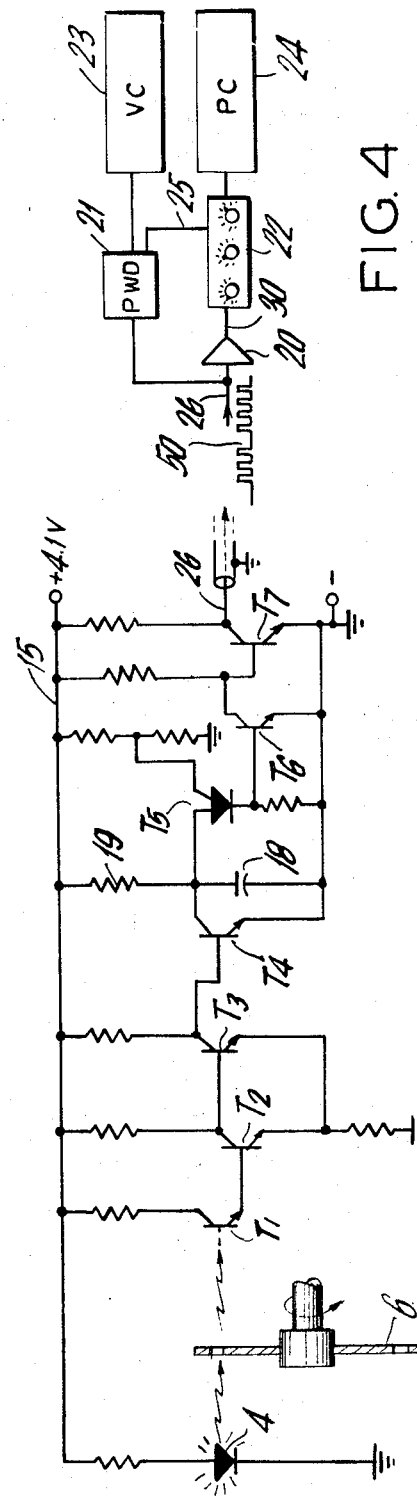
FIG. 4
FIG. 3
INVENTORS
WILLIAM M. BOOTH
ROBERT C. THOMPSON
BY
Thomas M Marshall
ATTORNEY

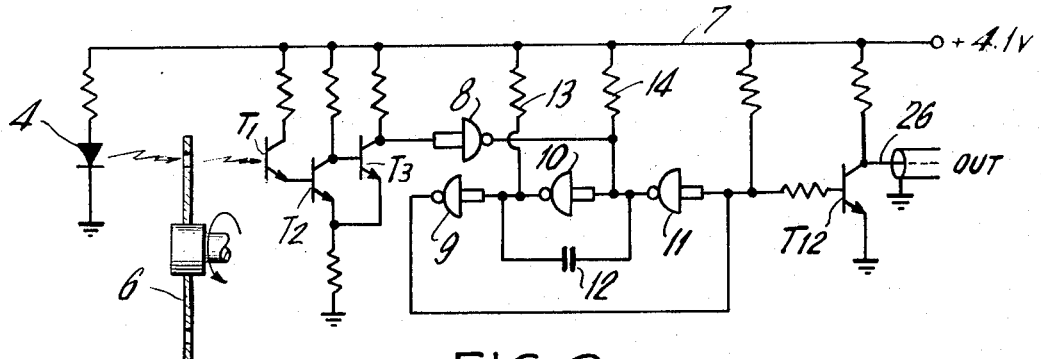
FIG. 2
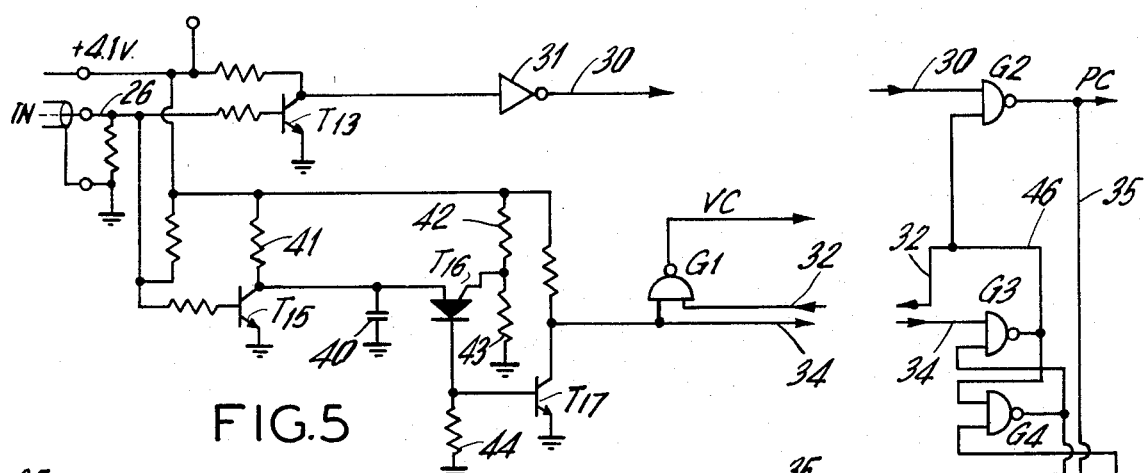
FIG. 5
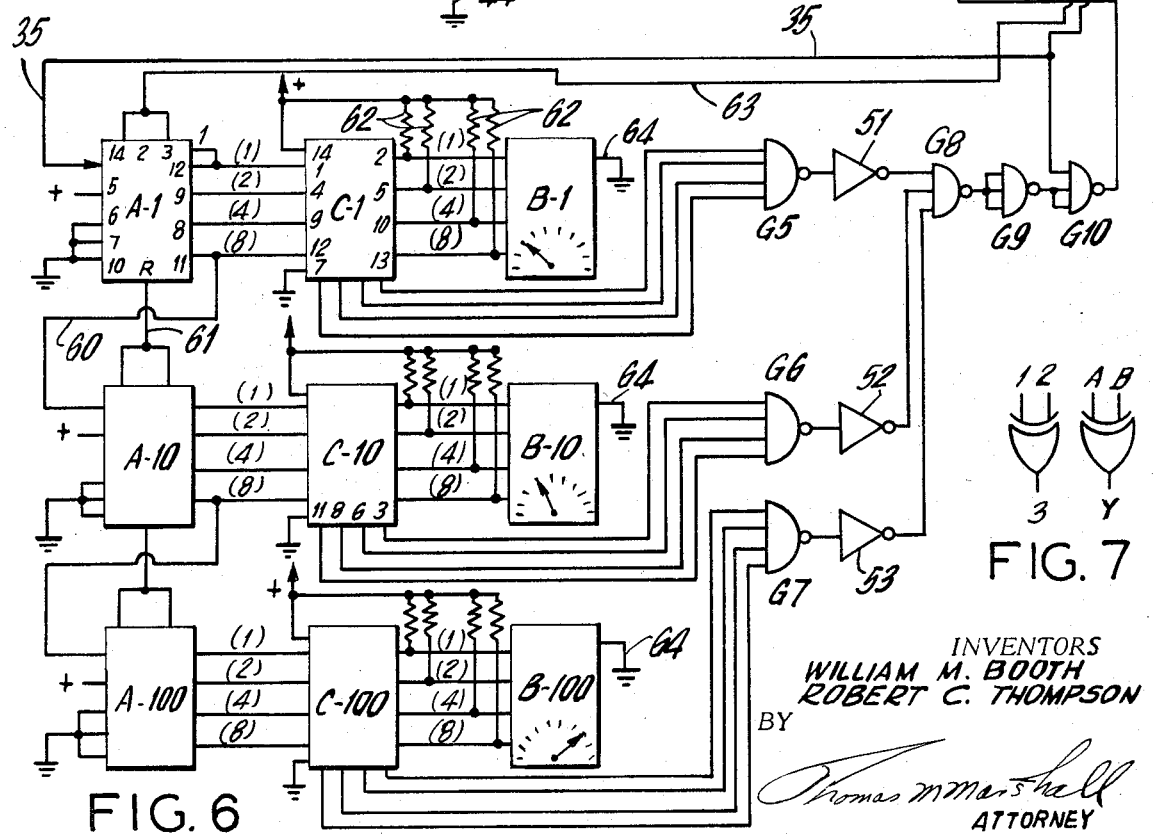
FIG. 6
FIG. 7
INVENTORS
WILLIAM M. BOOTH
ROBERT C. THOMPSON
BY
Thomas M Marshall
ATTORNEY 3,772,916

VARIABLE INCREMENT TRANSDUCER FOR FLUID FLOW METERING SYSTEMS

BACKGROUND OF THE INVENTION

This invention relates to an electronic signal generating device for fluid dispensers, and more particularly to an electromechanical arrangement for generating a signal whereby fluid passing through a flow meter is measured as well as a price calculated.

In the prior art, pulse generating devices of many forms have been developed. For example, in U. S. Pat. No. 3,543,008 to Kes et al. there is disclosed a pulse generating device comprising a switch and a cam which is driven by an input from a mechanical variator which is itself driven by a flow meter. The pulse generator is driven to provide a plurality of pulses, corresponding to an incremental quantity of fuel multiplied by a price factor set in the variator. The pulses are used for indexing a price counter.

In U. S. Pat. No. 3,043,508 to Wright a pulse counting device is illustrated. In this particular system a series of output pulses is generated by the flow meter at a rate varying with flow. This signal is gated to both the sale and gallon totalizer, with both counting the same signals in different proportions as determined by the respective gates. In this system, for each gate, a scaling circuit is used having two pre-set control points which determine the "on" and "off" time of its related gate in terms of a count of "clock" pulses received from an oscillator which drives both scaling circuits. The price gate has an adjustable first pre-set point, so that the gated pulses may in this case give a total proportional to the product of volume and unit price. The other pre-set points are determined and set by the calibration of the individual pulse generating flow meter which is used in this system. These pre-set points remain constant once determined and any change in these points requires re-calibration or conversion of the signal generator. This, of course, is an obvious inconvenience and expense.

While the prior art electronic signal generating devices used in fluid systems have been useful in overcoming the disadvantages of strictly mechanical flow counters, there are several difficulties presented by these pulse generating devices. For example, most electrical assemblies of this nature are multi-circuited and require voltages in excess of a minimal safety requirement for use in gasoline dispensers; that is, should there be a shorting out of the circuitry in most pulse generating electronic devices there is a likely possibility of gasoline fume ignition. Because the voltages involved were generally of levels involving risks of sparks, the circuitry has had to be positioned remotely from the gasoline pumps or alternatively encased in an explosion-proof housing structure. These alternatives are both cumbersome and, of course, expensive.

Therefore, it can be readily seen that there is a need for a convenient, safe, and inexpensive electrical signal generating device for purposes of measuring the quantity and cost of liquid being dispensed.

OBJECTS OF THE INVENTION

It is an object of the present invention to provide a new and improved solid state variable increment transducer for use in fluid dispensing systems.

It is another object of the present invention to provide a new and improved signal generating device having an output which can be used with variable flow devices for totaling volume output and product cost.

It is still another object of the present invention to provide a signal generating device whose output may be used for digital input to volume and cost totalizing systems for either static or dynamic readout.

Still yet another object of the present invention is to provide a signal generating device having both fixed and variable frequencies simultaneously transmitted on a single output lead.

And still yet another object of the present invention is to provide an intrinsically safe variable increment transducer signal generating device. The expression variable increment transducer is used to mean an electrical signal generating device actuated by a variable rate mechanical drive to provide indications of successive increments that have variable signal content resulting from variations in rate of flow.

SUBJECT MATTER OF THE INVENTION

Briefly, the variable increment transducer of this invention uses a fixed frequency signal generator which is adapted to be blocked at variable intervals by a second signal generator driven by a flow meter, providing pulses of blocking voltage or current, of variable duration in the usual case, which are substantially longer than the interpulse interval of the fixed frequency signal generator (usually at least several times the oscillation period of the latter). The pulses of blocking voltage, as well as the fixed frequency signals, are generated by semiconductor devices and circuits operating at a voltage of about 4 volts, so that they can safely be operated adjacent to machinery handling flammable liquids. In order for the pulses of blocking voltage or current to be variably timed by a flow meter, the semiconductor elements for generating these elements are a light emitting diode and a phototransistor, with the light path between them interrupted by a perforated disk rotated by the flow meter. Preferably the perforations correspond to the periods during which the fixed frequency signal means is blocked and the portion of the disc blocking the light path corresponds to the intervals during which a train of pulses is generated by the fixed frequency signal means, although obviously the converse conditions could also be used. The frequency of the fixed frequency signal means is related to the maximum flow to be measured, and hence to the rate of interruptions of the light path, so that even at the highest rate of flow at least 99 fixed frequency pulses are generated in the interval between pulses of blocking voltage if 2-digit unit prices are involved, at least 999 in the case of 3-digit unit prices, and so on.

The output of the variable increment transducer is normally utilized by an arrangement that includes a pulse width discriminator producing an output pulse between each train of fixed frequency pulses. These output pulses can be summed to indicate volume of liquid passed through the flow meter. The fixed frequency pulses can be fed to a pulse train trimmer that limits the number of pulses in each train to a number representative of the price per unit of volume, so that the output of this unit can be summed to indicate total price.

The reliability of that operation is assured by having the pulse width discriminator generate a gating pulse about twenty milliseconds after the end of a pulse train of the transducer output. The pulse train trimmer in the preferred arrangement operates a latch which is set by the gating pulse just mentioned and is reset when the count of pulses in the train reaches the value set in the pulse train trimmer, which operates as a price set device. Only the transducer pulses received while the latch is set are summed in the sale price counter. The gating pulse produced by the pulse width discriminator is preferably reset by the first pulse in the next train received from the transducer, and a volume count gate then produces a volume count pulse from the end of the said gating pulse until the resetting of the latch.

BRIEF DESCRIPTION OF THE DRAWINGS

The invention will be described by way of example with reference to the accompanying drawings, wherein:

FIG. 1 is a schematic view showing a portion of a fluid metering system embodying the present invention, along with a corresponding signal diagram;

FIG. 2 is a circuit diagram of one form of variable increment transducer suitable for use in the system shown in FIG. 1;

FIG. 3 is a circuit diagram of another form of variable increment transducer suitable for use in the system shown in FIG. 1;

FIG. 4 is a block diagram of the remainder of the fluid metering system partly shown in FIG. 1;

FIG. 5 is a circuit diagram of one form of pulse width discriminator for use in the portion of the fluid metering system shown in FIG. 4;

FIG. 6 is a circuit diagram of one form of price set device for use in the portion of the fluid metering system shown FIG. 7 is a diagram for explaining the nature of comparator units shown in FIG. 6.

DETAILED DESCRIPTION OF THE DRAWINGS

Referring to the drawings, and in particular FIG. 1, a portion of a fluid metering system is shown comprising a flow meter 1 having a cylindrical drive shaft element 2 rotatably driven by said meter and connected to the variable increment transducer 3 of the subject invention. The remainder of the fluid metering system is shown in FIG. 4. The variable increment transducer (VIT) 3 comprises a light-emitting diode 4 and a phototransistor 5, between which is a perforated disc 6 centrally connected to the cylindrical shaft element 2 for rotation in the direction of the drive element by the flow meter 1. Preferably the elements of the transducer are enclosed by a housing element 7 which may be composed of any type rigid material such as metal or plastic. The VIT additionally comprises an oscillator which is adapted to be intermittently blocked in response to light falling on he phototransistor, so as to form a system whereby the perforations or holes in disc element 6 are detected, as will be more fully explained with reference to other figures of the drawings.

In operation the gasoline or other fluid being dispensed passes through the flow meter 1, operating it to turn rotatable cylindrical shaft element 2. In such a system, the total number of rotations produced is directly proportional to the total quantity of fluid that is passed through the meter. The flow meter may be a mechanical-displacement or electrically driven meter, the only requirement being a correspondence between the number of revolutions of the drive element and the volume of fluid passing through the meter.

To the left of the fluid dispenser assembly of FIG. 1 are shown three leads; that is, a voltage supply lead, an output lead and a ground lead. About 4 volts of direct current are applied to the VIT between the voltage supply lead and ground. When there is no contact of light from the light-emitting diode 4 on the phototransistor 5, as explained below in connection with FIG. 2, an oscillating square wave pattern having an amplitude of about 4 volts, appears at the output, preferably having a frequency or pulse rate of about 100 thousand cycles per second or 100 kilohertz (kHz). The semiconductor transistor elements in the VIT circuit when conducting have an internal voltage drop of the order of a small fraction of a volt, so that even with load resistors in the circuit a supply voltage about 4 volts, for example the convenient value of 4.1 v., is amply sufficient.

Now following the graph to the right in FIG. 1 it can be seen that the first 1/100th gallon count occurs because a hole in the disc allows the phototransistor and the light from the diode to be in contact. When this occurs, the oscillation signal generator is momentarily stopped and there is a long negative pulse (which may be regarded as a long interpulse interval) as shown in the drawings. This, of course, corresponds to an increment of quantity pre-determined by the number of holes in the perforated discs, as well as the number of rotations per gallon of fluid or gasoline. In the specific embodiment referred to in FIG. 1, there are 25 holes in the disc and the rotation set at four revolutions per gallon passing through the flow meter. Therefore, as can be seen to the right-hand side of FIG. 1, there is a clear distinction between the pulse width of the oscillation and that of the cessation period of oscillation, these distinctions being transformable into actual calculations of quantity and price. The oscillation signals are usable to provide a measure of price, as will be explained in connection with FIG. 4, while the longer negative signals correspond to some increment of quantity, which in the present example corresponds to 1/100th of a gallon count.

The wave diagram in the right-hand portion of FIG. 1 demonstrates the varying frequency of the negative pulses, on an illustrative scale using only a few pulses between blocked intervals, since it would be impractical to show pulse trains with 999 or more pulses. In actual dispensing operations the rate of liquid flow varies as the result of regulation of the dispenser nozzle by an operator. Therefore the frequency of the negative pulses (gaps between trains of short pulses) will vary according to the speed of the dispenser resulting in a pattern having variable increments of oscillating and negative pulses.

Referring now to the electrical schematic diagram of FIG. 2 which represents one type of circuitry for the variable increment transducer of the present invention, there are shown semiconductor transistor elements T1, T2 and T3 which are adapted to apply blocking conditions intermittently to an oscillation system comprising a clamp element 8, in combination with three oscillator semiconductor elements 9, 10 and 11, in which the values of capacitor 12 and resistors 13 and 14 set the oscillation frequency. The four semiconductor elements 8, 9, 10 and 11 may be elements of a single-chip semiconductor device commonly designated as a clock-ring oscillator unit. When light from diode 4 is not impinging on the phototransistor T1, the clock-ring elements 9, 10 and 11 generate oscillations in the circuit shown at the rate of 100 kHz. The oscillating output is inverted by the circuit of T12, so that when oscillations are blocked the output voltage will drop toward ground potential (relatively negative). Instead of a semiconductor at T12 some other type of controlled switch could be used.

When light passes through a hole in the perforated disc 6 thereby impinging on phototransistor T1, current is fed to semiconductor element T2 which is the input element of a Schmitt trigger circuit. T2 is then switched on and T3 switched off. The output of T3 when T3 is switched off causes element 8 to clamp off or block the operation of the clock-ring oscillator, so that a relatively long negative pulse (or interpulse interval) appears at the output of T12. This negative pulse corresponds to an increment of volume. As mentioned above, the frequency of the negative pulses will vary according to the rate at which the liquid passes through the meter 1.

Referring now to the electrical schematic diagram of FIG. 3, which represents another oscillating system for the variable increment transducer of the present invention, 4.1 volts of direct current is applied to the supply bus 15 from which light diode 4, phototransistor T1 and transistors T2 through T6 are energized. When light from the diode is not impinging on phototransistor T1 (FIG. 1), T1 and T2 are non-conducting and T3, which forms a Schmitt trigger with T2, is conducting. However, T4 accordingly is then non-conducting, so that it does not interfere with oscillation of semiconductor element T5, resistor R1 and capacitor C1, operating together. Semiconductor T5 is a programmed uni-junction transistor (PUT), and is free running at about 100 kHz (100,000 cycles/sec) as determined by the RC constant provided by capacitor 18 and resistor 19. Transistor T6 and T7 amplify the output of T5. Little amplification, if any, is needed here, but two stages are used to provide the same output polarity as the circuit of FIG. 2 and maintain suitable output impedance.

When light passes from the light-emitting diode to the phototransistor T1, the latter is turned on, and likewise T2 which turns T3 off. T4 is thereby turned on and clamps the operation of R1 and C1, stopping the operation of the 100,000 cycle uni-junction oscillator during the duration of the disc opening, i.e., the light-emitting period. The emitter potential of T5 then goes to zero, T6 is turned off causing its collector to go positive, T7 is turned on and holds the output line voltage at zero.

FIG. 4 is a block diagram of the way the output signal would be routed into a totalizing digital system readout. The signal which is shown in FIG. 1 will be fed into both a pulse width discriminator 21 and, preferably through an amplifier 20, into a price set device 22. The price set device 22 is adjustable but pre-set to recognize a certain number of cycles in the oscillation pattern. Once a certain number of pulses have been accounted for, the price set output will be shut off until reset after recognition by the pulse width discriminator 21 of a volume count. The pulse width discriminator 21 is set to recognize a pulse width or an interpulse interval beyond that which appears in the free running output of the fixed frequency oscillator.

The pulse width discriminator must of course be able to recognize, as a wide interpulse gap, an interval corresponding to the passage of light through a perforation in the disc 6 when the latter is turning at its highest operating speed. In order to provide immunity from random disturbances and thus enhance reliability, the response of the pulse width discriminator is set to take place after an interval a little shorter than the minimum duration of the light pulse produced by the passage of a perforation of the disc 6 between diode 4 and phototransistor T1. This response may be a brief trigger pulse that can be supplied to reset the price set device 22 as well as to advance the volume counter 23. It is rather advantageous, however to have the pulse width discriminator 21 have an output in the form of a pulse of such length that it does not end until the first fixed frequency pulse of the next pulse chain has ended, even when the disc 6 is turning at its lowest operating speed. Then this long output pulse of the pulse width discriminator can be used to open a "latch" gate through which pulses of the next pulse train are passed to counting circuits in both units 22 and 24 until the former (22) closes the "latch" when the unit price count is reached. The pulse width discriminator pulse is terminated by the first pulse of the train of pulses, thus enabling the volume count gate until the "latch" closes. This preferred arrangement of which a diagram is shown in FIGS. 5 and 6 makes sure that the volume counter is advanced in the event that pulses are being furnished to the price set device. It guards against some possibilities of false counting and permits the use of a device, not shown, for stopping the pump at the dispenser when no volume counting pulses are coming through as expected, whether these fail to come through because of the malfunction of the pulse width discriminator, the failure of the high frequency oscillator, the failure of diode 4, or for any other reason.

FIG. 5 shows a circuit arrangement usable for the amplifier 20 and the pulse width discriminator 21 of FIG. 4. This circuit is intended to work with the type of price set device shown in FIG. 6. It will be seen that the connection 25 shown on FIG. 4 represents, in the case of the circuits of FIG. 5 and FIG. 6, not just a single connections but two conductors 32 and 34 which interconnect the output gate of the pulse width discriminator with a latch circuit operated by the price set device. The amplifier 20 shown in FIG. 4 is shown in FIG. 5 as consisting of transistor T13 and inverter 31. The output of the latter goes to the price set device over conductor 30.

In addition to furnishing signals to the circuits of FIG. 6 over the conductors 30, 32 and 34, the circuit of FIG. 5 operates a gate G1, the output of which supplies pulses to the volume counter 23 of FIG. 4, while the circuit of FIG. 6 operates a gate G2 which supplies measured trains of pulses to be summed by sale price counter 24 of FIG. 4.

When the signal from the variable increment transducer received through the conductor 26 is at its negative extreme, that is, near ground potential, the base current of transistor T15 is reduced to near zero, transistor T15 becomes nonconducting and capacitor 40 begins to charge through resistor 41. During the normal interpulse interval of the fixed frequency oscillator in the variable increment transducer very little charge accumulates in capacitor 40, because the next pulse restores the base current of T15, which then conducts and discharges capacitor 40. When, however, there is an abnormally long interpulse interval resulting from light falling on phototransistor T1 (FIG. 2 or FIG. 3), corresponding to the "hole" 50 shown in the wave form diagrams (FIGS. 1 and 4), capacitor 40 has time to charge up to a voltage sufficient to turn on T16, which is a programmed unijunction transistor that is then held in a conducting state because of the low or moderate value of resistor 41. The turning on of T16 also turns on transistor T17, which likewise is normally cut off.

Capacitor 40 and resistor 41 are preferably chosen with magnitudes providing a 2 millisecond interval between the beginning of the "hole" 50 and the firing of T16. This interval is consistent with a maximum flow meter rate of 24 gallons per minute, and 40 light pulses per second through disc 6 each having a duration of about 3 milliseconds. With resistors 42 and 43 both having a value of 10k ohms, setting the firing point of T16 at near half the supply voltage, resistor 41 may conveniently have the value of 10k ohms and capacitor 40 that of 0.5 mfd in order to produce a firing interval for T16 at about 2 milliseconds. Load resistor 44 of T16, likewise having a value of 10k ohms, causes T16 to latch and not relax but remain on due to the shift in intrinsic stand off ratios. This produces a unique delay-on circuit that will reset with a closure of T15.

Transistor T17 inverts and amplifies the output of T16 and sets a bistable set-reset memory latch composed of NAND gates G3 and G4. While T16 is conducting for the remainder of the "hole" interval after the first 2 milliseconds, the collector of T17 is substantially at zero or ground potential, while the other side of the latch, i.e., its output on conductor 46, is substantially at the supply voltage.

At the end of the "hole," fixed frequency pulses again appear on conductor 26, having a duration of 5 microseconds on and 5 microseconds off in the illustrated case of a 100 kHz oscillator. The first of these pulses restores conductivity to T15 and causes capacitor 40 to discharge, which in turn extinguishes T16 and cuts off T17. The latch composed of G3 and G4, however, remains in its set condition until reset by operation of G10 as explained below in connection with FIG. 6.

Before T16 was fired the latch G3, G4 was in its reset condition, applying a voltage essentially at ground potential to one leg of gates G1 and G2. When T16 fires and causes T17 to conduct, the voltage near the supply voltage that was being applied by T17 to G1 drops to near ground potential, so that when the same event causes latch G3, G4 to be set, gate G1 still does not operate. When T16 is extinguished, however, T17 is then cut off while latch G3, G4 remains set, so that gate G1 then operates and provides a volume count pulse that lasts until latch G3,G4 is reset. In the meanwhile the 5 microsecond pulses applied to gate G2 by inverter 31 cause gate G2 to operate on each pulse while the latch G3, G4 remains set. Gate G1, however, does not operate repeatedly, because succeeding 5 microsecond pulses, as previously explained, cannot cause T16 to be fired. Gate G1 and G2 are thus protected against disturbance from vibrations of the disc 6 in the event it should be stopped with the edge of one of its holes in the path between light diode 4 and phototransistor T1.

It will be noted that the programmed unijunction transistor T16 in FIG. 5 is connected in the same way as T5 in FIG. 3, but the time constant of the resistor capacitor combination 18, 19 is, of course, of the order of microseconds, whereas that of resistor 41 and capacitor 40 is of the order of milliseconds.

The circuit shown in FIG. 6 counts the 5 microsecond pulses supplied over wire 35 by means of counting modules A-1, A-10 and A-100 and compares the resulting units, tens and hundreds count with the corresponding units, tens and hundreds digits set in the binary switches B-1, B-10 and B-100 respectively, the comparison being carried out at the respective decimal positions by comparator modules C-1, C-10 and C-100, respectively. Each binary switch provides the proper binary code on four output wires to correspond to the decimal digit of its setting. When the count reaches the value set on the switches, gates G5, G6 and G7 cause gate G8 to operate. Inverters 51, 52 and 53 are provided between gate G5, G6 and G7 and the respective inputs of gate G8. Inverter 31 of FIG. 5 and inverter 51, 52, and 53 of FIG. 6 may conveniently be supplied on a single semiconductor device. For example a type known as SN 7404 provides six such units. The common battery and ground connections for these units is omitted from FIGS. 5 and 6 for convenience.

The operation of comparator circuits of the kind shown in FIG. 6 is described in more detail in the pending application of William M. Booth, Filed Oct. 4, 1971, Ser. No. 186,214. Briefly, the units A-1, A-10 and A-100 are integrated semiconductor circuit modules, preferably type SN 7490. The connections for that specific type of circuit unit are indicated in FIG. 6 by the numbers and the letter R on unit A-1. Connection No. 5 is connected to the supply voltage, designated by the plus sign. The connection of units A1 and A10 to the next highest counting state includes a connection from the 8 level, shown by conductor 60, and a connection from the R (reset) terminal shown by conductor 61. Unit A1 is reset by ground potential on conductor 63 when T16 fires. Supply voltage on conductor 63 inhibits counting after the latch has been reset by operation of G10 described below.

The comparator units C1, C10 and C100 consist of exclusive OR gates of the type shown in FIG. 7. The units are preferably of the kind known as type SN 7486 and the connection designations for that specific type are shown, for the input connections, on unit C-1 and for the output connections on unit C-10 in FIG. 6. The battery and ground connections are shown on all three units.

The quad of wires between each counting unit and each comparator unit and between each comparator unit and each binary switch unit corresponds to binary digits having the values 1, 2, 4 and 8 as noted in FIG. 6 by numerals in parentheses. Thus, at the 1 level, comparator C-1 has an input on 1 from counter A-1 and an input on terminal 2 from binary switch unit B-1. These are connected to the inputs of an exclusive OR gate, as shown in the left hand half of FIG. 7, and the output of that gate goes to terminal 3 of the comparator unit (see numbering on unit C-10). The truth table for each of the four gates in each comparator with the input and output respectively designated by A, B and Y as shown in the right hand portion of FIG. 7, is as follows:

| A | B | Y |
|---|---|---|
| 0 | 0 | 0 |
| 0 | 1 | 1 |
| 1 | 0 | 1 |
| 1 | 1 | 0 |

Four Y outputs for the four binary digits of each decimal comparison directly operate 4-input NAND gates G5, G6 and G7. The common switch leg 64 is at ground and each binary leg selected by the switch is therefore a zero, while the remaining switch legs are brought to the supply voltage, which corresponds to "1" in the truth table, by pull-up resistors 62. A match is made on all four legs when A, B (FIG. 7) are 0-1 or 1-0 in order to provide Y=1 into G5, G6 and G7. This means that the binary switches set zeros on the binary digit levels at which a 1 will appear on the counter side when the decimal digit in question is reached.

Gates G5 and G6 may conveniently be gates provided on a dual unit of the type designation SN 7420. Gate G7 is then half of another such unit. Gates G8, G9 and G10 may be identical sections of a triple unit available under the designation SN 7410. Gate G9 is simply one of these gates units connected so as to function as an inverter and gate G10 is one of these units connected so as to function as a 2 input gate.

When the number of pulses counted by units A-1, A-10 and A-100 matches the number set in switches B-1, B-10 and B-100, gate G10 provides a pulse to gate G4 which resets the latch G3, G4. Gates G1 and G2 are thereafter blocked until programmed unijunction transistor T16 fires and sets the latch again. Gate G10 is intermittently blocked over conductor 35 so that it cannot operate during a pulse and thus mutilate it.

The overall operation of the variable increment transducer of the present invention will now be described. As the liquid dispenser, such as a gasoline pump, is activated, the shaft 2 (FIG. 1) begins rotating in correspondence to the volume flowing through the meter. Likewise perforated circular disc 6 connected to the shaft 2 rotates thereby intermittently passing and cutting off the light flowing from light-emitting diode 4 to the photogransistor 5 (T-1 in FIGS. 2 and 3) through the disc. As previously explained, the result is to provide successive trains of 100 kHz pulses separated by gaps of the order of milliseconds, which are easily distinguishable from the 5 microsecond interpulse intervals of the 100 kHz pulses. The pattern of pulse trains is delivered to a digital readout system having a pulse width discriminator 21 and a price set device 22, (FIG. 4) which are respectively connected to readout mean 23 and 24. The price set device 22 allows passage of only a certain number of frequency oscillations, corresponding to a price, and then turns off its output until re-set by the next signal from the pulse width discriminator 21.

By way of example, if the price per gallon in the instant system were set at 42.9 cents in the pricing circuit, and the perforated disc generated 100 negative pulses for each gallon of fuel delivered (i.e., 25 perforations and 4 rotations per gallon), then the price set device 22 passes 429 cycles or pulses and turns off its output, having recorded the price of 1/100 of a gallon, 0.00429 dollars (1/100 of 42.9 cents). The price set device 22 is re-set (output turned on again) when a wide negative pulse is detected by the pulse width discriminator 21 indicating the passing of an increment of volume. As the sale continues 429 additional pulses are allowed to pass through to the sale readout 24 for every pulse passed through to the volume readout 23. When one gallon of product has been delivered and the transducer has supplied one hundred negative pulses to the system, the price set device 22 will have counted 42,900 oscillations.

It can be readily appreciated from the foregoing that the frequency of the fixed frequency pulse signal must be high enough to insure that a sufficient number of fixed frequency pulses can occur between the negative pulse volume increment signals to account for whatever the unit price may be set in the price set device 22.

By way of further example, if a price of 99.9 units per unit volume is desired then 999 pulses of the fixed frequency must occur between each increment of volume. This is the largest number needed, of course, for any three digit price setting. 99 pulses would, similarly suffice for any two digit unit price. With a constant frequency oscillator an outer limit on the amount of volume per minute that can be passed through a meter is thus necessarily imposed. An oscillator functioning at 100 kHz provides more than the required number of pulses for wide range of price variation and volume rate capactiy for 3-digit price settings.

It is important to realize that the variable increment transducer of the present invention can be located within or adjacent to a gasoline pump without various safety problems. This is because the present variable increment transducer contains solid state semiconductors which operate at voltage potentials of less than one volt and, therefore, the total system only requires an input of about 4 volts for operation. This voltage qualifies the present variable increment transducer as an intrinsically safe component in gasoline dispensers. Therefore, the present transducer, being of simple construction with regard to components, does not require a sophisticated housing structure. Simplified and inexpensive plastic or metal housing elements may be used.

The price set device 22 shown as part of the digital totalizer of FIG. 4 could, if desired, be incorporated within the variable increment transducer element shown in FIG. 1, especially if provided to operate on the same 4.1 v. supply, in which case it could be reset by a pulse derived from T3.

Although a specific preferred embodiment of this invention has been described in detail in connection with the schematic diagrams of the drawings, it would be apparent to one skilled in the art that many modifications can be made without departing from the spirit and scope of the invention. Therefore, the only limitations to be placed on the scope of this invention are those set forth in the claims which follow.

What is claimed is:

1. A variable increment transducer, for use with a fluid flow metering device, comprising:
   a. a first signal means adapted to produce relatively short pulses at a relatively high and substantially constant frequency and adapted to be blocked by a blocking voltage or current, said first signal means having an output semi-conductor or switch means which is connected to ground whereby, when said first signal means is blocked, the polarity of the output voltage of said first signal means is near ground potential;
   b. a second signal means adapted to generate pulses of blocking voltage or current of durations substantially exceeding the pulse period of said first signal means at variable intervals which always are of sufficient duration to permit a train of a multiplicity of pulses to be generated by said first signal means, with the duration of a pulse of blocking voltage or current being variable in proportion to the length of said variable intervals, said second signal means including a light source, a light sensitive element, a rotary interrupter adapted to block light from said light responsive element periodically, and circuit means which is connected to the output of said light sensitive element and operative, when said light sensitive element is energized by the passage of light from said light source through said interrupter, to generate said pulses of blocking voltage or current;

c. means for driving said second signal means at a cyclic rate corresponding to the rate of flow of fluid in said flow metering device;

d. means for applying said pulses of blocking voltage or current to said first signal means for periodically blocking said first signal means; and e. output means for supplying pulse trains generated by said first signal means during said variable intervals to registering or indicating equipment.

2. A variable increment transducer as defined in claim 1 in which the frequency of said first signal means and the maximum rate of said flow metering device are so related that said variable intervals at least exceed 999 cycle periods of said first signal means.

3. A variable increment transducer as defined in claim 1 in which said means for driving said second signal means is a shaft transmitting rotary motion from a flow metering device to said rotary interrupter.

4. A variable increment transducer as defined in claim 3 in which said interrupter is arranged to block light from said light sensitive element during the said variable intervals during which the operation of said first signal means is not blocked by said second signal means.

5. A variable increment transducer as defined in claim 3 in which said light source, said light sensitive device and all the active elements of said first and second signal means are semiconductor devices capable of operation at a supply voltage not exceeding 6 volts.

6. A metering system for use with a flow metering device for flammable liquids including, in combination:

a variable increment transducer including:

i. a first signal means adapted to produce relatively short pulses at a relatively high and substantially constant frequency and adapted to be blocked by a blocking voltage or current;

ii. a second signal means adapted to generate pulses of blocking voltage or current of durations substantially exceeding the pulse period of said first signal means at variable intervals which always are of sufficient duration to permit a train of a multiplicity of pulses to be generated by said first signal means;

iii. means for driving said second signal means at a cyclic rate corresponding to the rate of flow of fluid in said flow metering device;

iv. means for applying said pulses of blocking voltage or current to said first signal means for periodically blocking said first signal means; and v. output means for supplying pulse trains generated by said first signal means during said variable intervals to registering or indicating equipment;

count limiting means for limiting to an adjustable predetermined number the number of pulses in each of said pulse trains supplied by said output means of said transducer which are passed on at the output of said count limiting means;

a pulse width discriminator adapted to produce a pulse in response to each interval between said pulse trains;

means for counting pulses directly or indirectly produced by said pulse discriminator; and means for counting the total number of pulses of a plurality of said pulse trains supplied in sequence by said output means of said transducer as limited by said count limiting means.

7. A metering system as defined in claim 6 in which said count limiting means is located in proximity to said transducer and is provided with a connection adapted to reset said count limiting means during the period said first signal means of said transducer is blocked by said means for applying said pulses of blocking voltage or current.

8. A metering system as defined in claim 6 in which said count limiting means, said pulse width discriminator and said respective counting means are located outside the immediate proximity of said transducer and in which a connection is provided to enable resetting of said count limiting means in response to the production of a pulse by said pulse width discriminator.

9. A metering system as defined in claim 6 having gate means associated with said pulse width discriminator adapted to generate, after operation of said pulse width discriminator, a single output pulse in response to one or more pulses of the next of said pulse trains, said output pulses so generated by said gate means constituting pulses indirectly produced with said pulse width discriminator counted by the means for counting pulses directly or indirectly produced by said pulse width discriminator.

10. A metering system as defined in claim 6 in which said count limiting means has, in addition to counting means, setting means and comparison means, also a bistable set-reset memory latch circuit which:

I. is arranged to be set by an output pulse of said pulse width discriminator and to be reset by said comparison means when the number of pulses in one of said pulse trains reaches a predetermined number setting means and II. has outputs arranged in the "set" condition of said latch i. to initially reset and to enable operation of said counting means by pulses of one of said pulse trains and ii. to enable operation of output gates for volume and price count pulses, III. said outputs being also arranged in the "reset" condition of said latch i. to inhibit operation of said counting means and ii. to block said output gates.

11. A metering system as defined in claim 10 in which said output pulses of said pulse discriminator begin after a predetermined interval following the termination of one of said pulse trains, as determined by a passive timing network, and are ended by the arrival of the first pulse of the next of said pulse trains and in which system, further, volume count pulses are produced by said volume count output gate beginning with the ends of said output pulses of said pulse width discriminator and ending with the resetting of said latch circuit.

* * * * *